Aug. 4, 1953 — W. F. ALLER ET AL — 2,647,456
GAUGING DEVICE
Filed Feb. 26, 1949 — 5 Sheets-Sheet 1
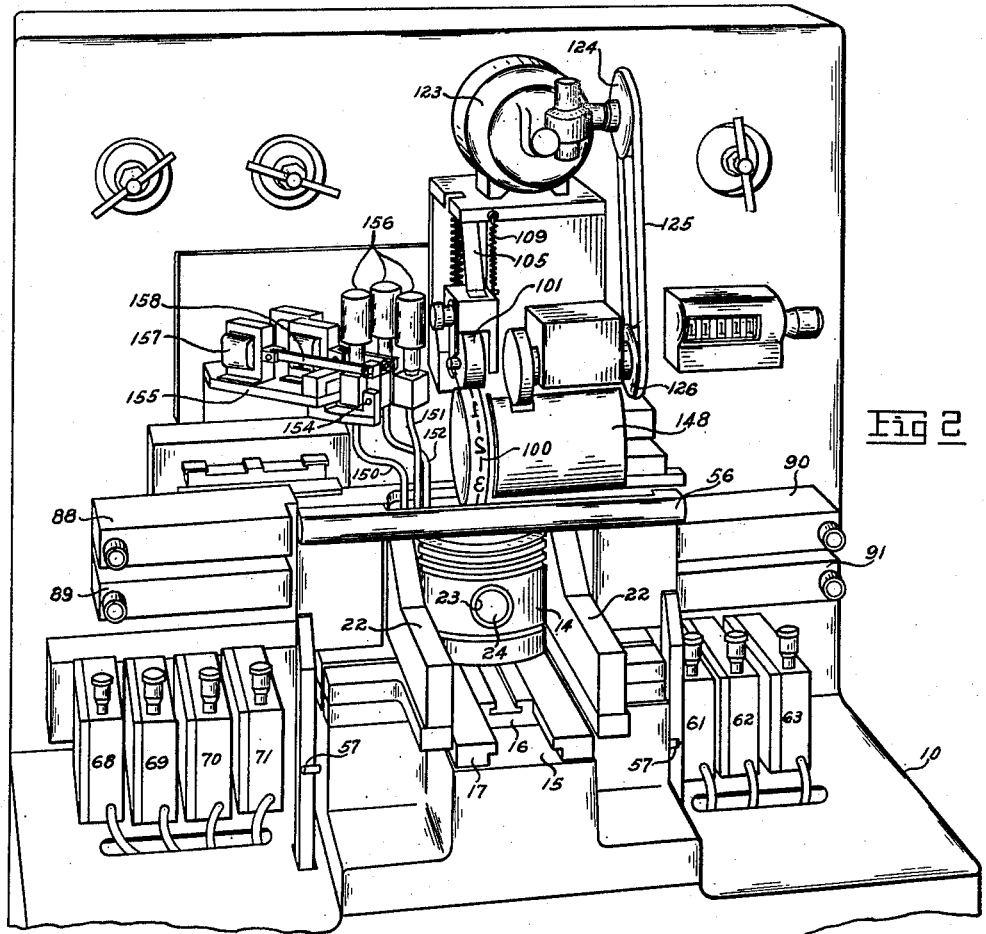
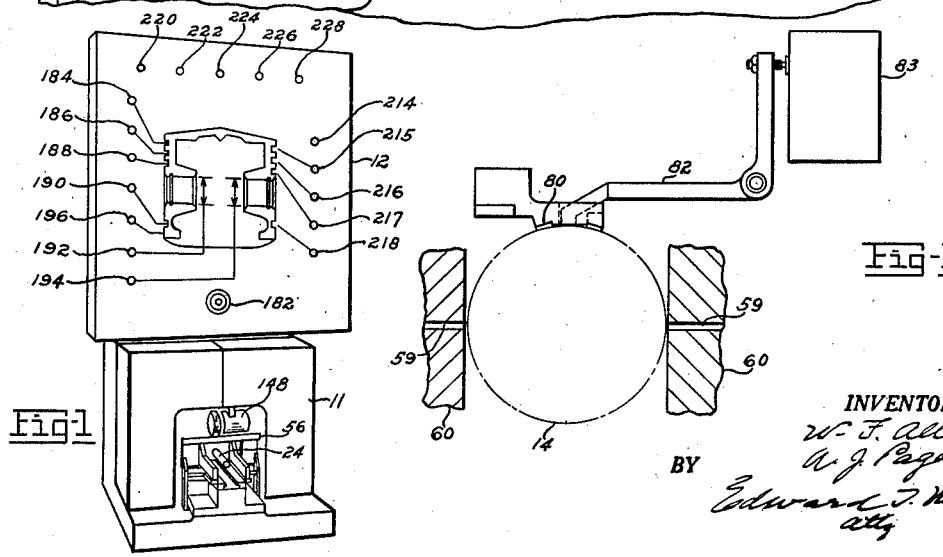
INVENTORS
W. F. Aller
A. J. Page
BY Edward J. Noig
atty

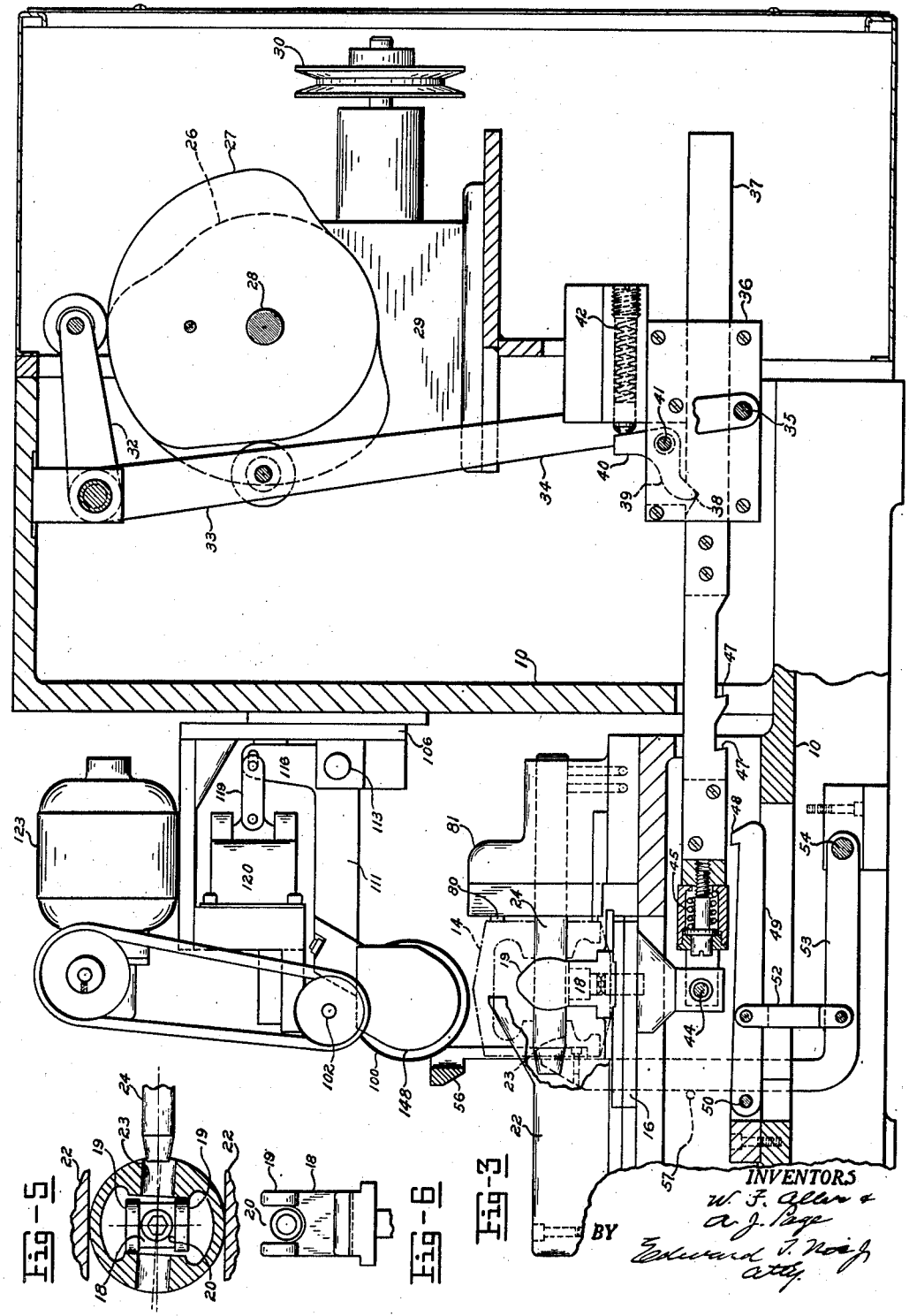

Aug. 4, 1953　　　W. F. ALLER ET AL　　　2,647,456
GAUGING DEVICE
Filed Feb. 26, 1949　　　　　　　　　　5 Sheets-Sheet 3

INVENTORS
W. F. Aller
A. J. Page
BY Edward T. Noif
atty

Aug. 4, 1953
W. F. ALLER ET AL
2,647,456
GAUGING DEVICE
Filed Feb. 26, 1949
5 Sheets-Sheet 4
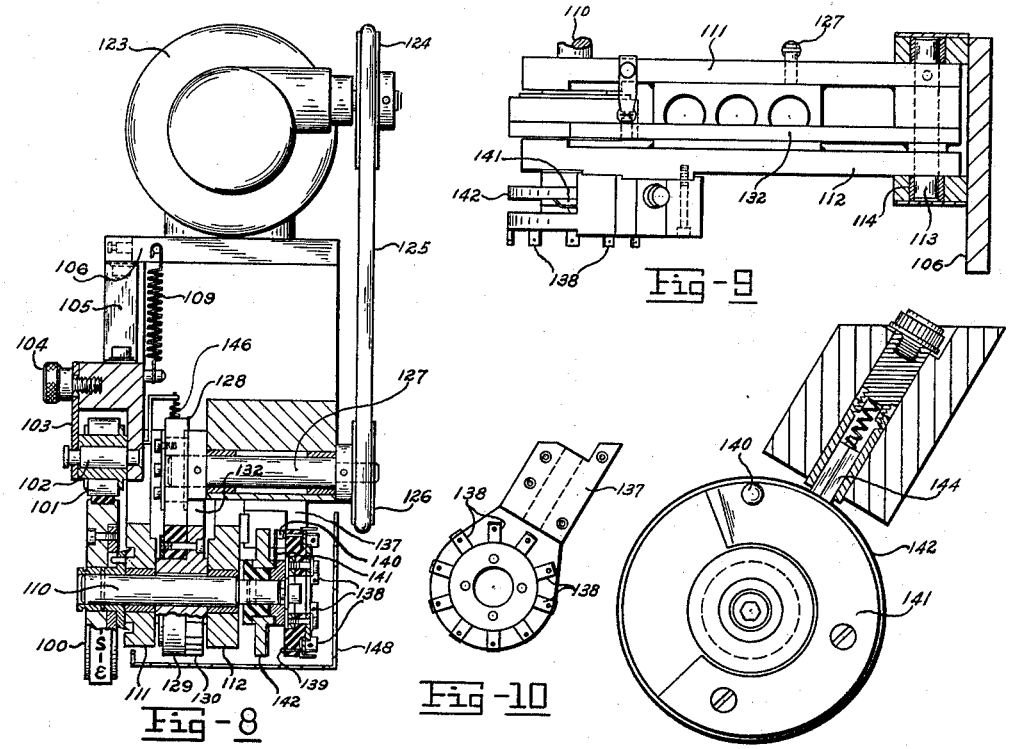
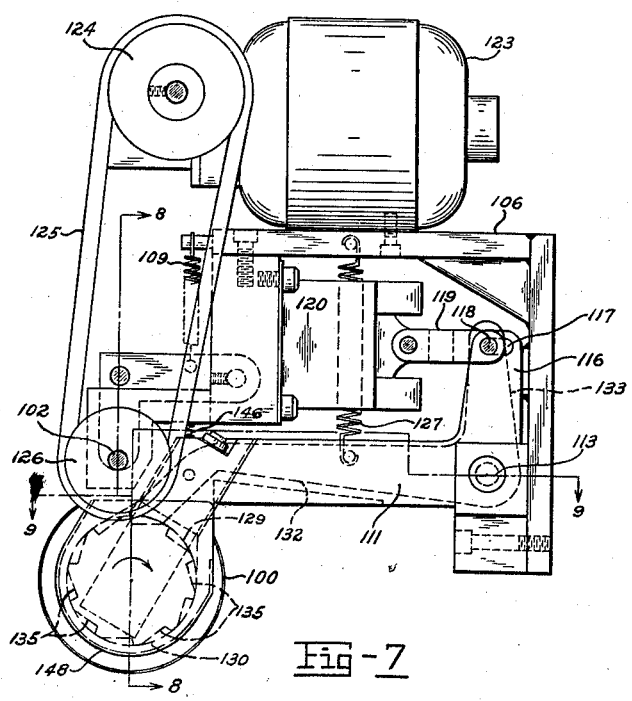
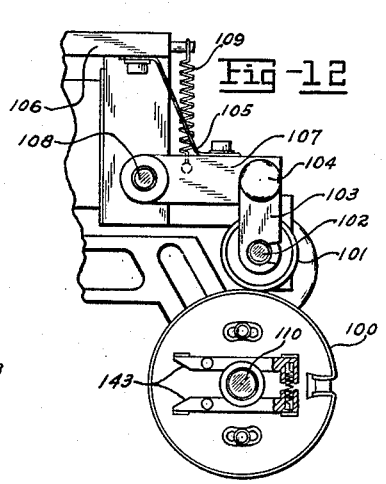
INVENTORS
W. F. Aller +
A. J. Page
BY
Edward J. Noé
atty Patented Aug. 4, 1953

2,647,456

UNITED STATES PATENT OFFICE 2,647,456

GAUGING DEVICE

Willis Fay Aller and Anthony J. Page, Dayton, Ohio, assignors to The Sheffield Corporation, Dayton, Ohio, a corporation of Ohio Application February 26, 1949, Serial No. 78,508

7 Claims. (Cl. 101—43)

This invention relates to gauging apparatus and more particularly to apparatus for gauging articles and selecting and marking the articles according to size.

In accordance with the present invention an article is supplied to a gauging station where the actual gauging takes place, and dependent upon the results obtained in the gauging station the articles are marked according to the size range or ranges of the dimension or dimensions checked. In its preferred form, the marking means includes a device having a series of different characters indicative of different article dimensions, these different characters being automatically selected and applied to the article. There is also provision in the supply means for properly arranging the article so that it can move in the proper manner to the gauging station. Where the article is a piston, for example, the piston pin hole is thus automatically brought into approximate alignment with the direction of the supply movement of the article and the article is then accurately positioned for gauging during its movement into gauging position. The articles in their travel to the gauging position are moved by a moving mechanism which is power driven so as to reciprocate back and forth, there being provision for automatically disabling the moving mechanism in case the article itself is improperly positioned or in case the hand of the operator is ahead of the article.

It is thus one object of the invention to provide a gauging apparatus having marking means provided with a series of different characters indicative of different article dimensions under the automatic control of the gauging means so that the proper marking is applied to the article.

Another object is the provision of a gauging apparatus of the character mentioned in which the marking means has a series of different characters indicative of different article dimensions, the characters being automatically brought into proper position adjacent the article ready for application to the article and then automatically applied to the article while the article is in gauging position.

Another object is the provision of an article gauging device having means for approximately locating the article as it is applied at the loading station and additional means for accurately positioning the article for gauging during movement of the article to the gauging position, a further object being the provision of means for automatically disabling the moving means that supply the article to the gauging position in case of improper arrangement of the article or the hand of the operator.

Another object is the provision of a gauging apparatus for gauging a number of different dimensions and selecting some of those dimensions according to different size ranges and automatically stamping markings on the article to indicate the different size ranges of some of the dimensions, with provision for disabling the stamping mechanism in case any of the different dimensions gauged are entirely outside of acceptable tolerances.

Other objects and advantages of the invention will be apparent from the following description, the appended claims, and the accompanying drawing, in which Fig. 1 is a perspective view on a reduced scale of a gauging device embodying the present invention;

Fig. 2 is a perspective view on an enlarged scale showing the gauging and supplying mechanism as viewed from the front of the gauge;

Fig. 3 is a vertical sectional view of the gauging apparatus;

Fig. 5 is a horizontal section through the piston and the piston arranger which approximately locates the piston in proper position for application to the gauging station;

Fig. 6 is a side elevation of the arranger;

Fig. 7 is a side elevation of the marking mechanism which applies a selected character to the article according to the selected size range in which the dimension checked falls;

Fig. 8 is a vertical sectional view through the marking mechanism on line 8—8 of Fig. 7;

Fig. 9 is a horizontal sectional view through the marking mechanism, taken on line 9—9 of Fig. 7;

Fig. 10 is a detail of the stationary electrical connection means by which the proper character of the marking means is selected;

Fig. 11 is a detail view on an enlarged scale showing how the electrical connection is made between the rotating brush and the non-rotating parts of the character selecting device of the marking means;

Fig. 12 is a side view of a portion of the marking means showing how portions thereof are adapted for ready removal;

Fig. 13 is a horizontal sectional view through the article in gauging position, illustrating the energizing or enabling switch which initiates a gauging cycle and showing the location of the diameter gauging holes for checking the piston skirt outside diameter.

Figure 4:
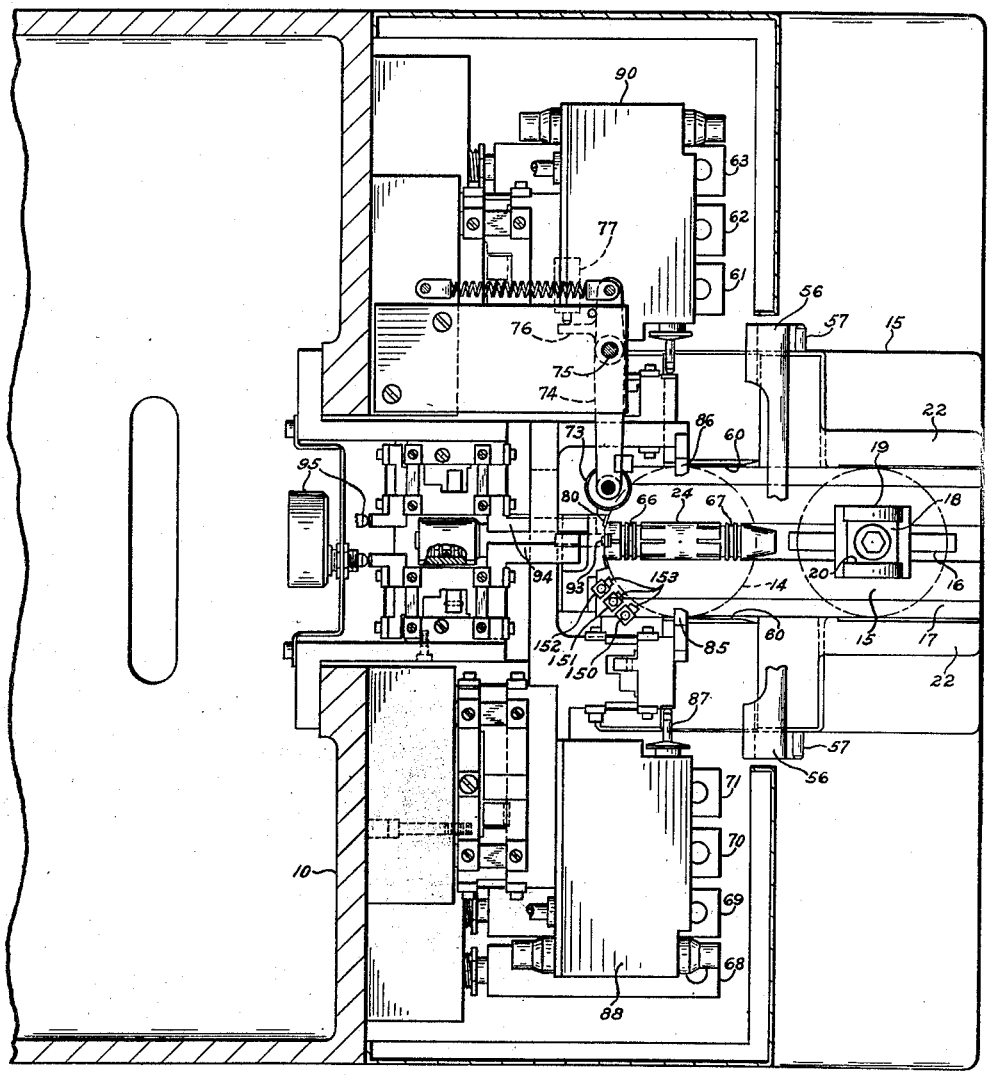
Fig. 4 is a horizontal sectional view taken above the level of the gauging apparatus some parts of which have been omitted for provision of clarity.

Referring more particularly to the drawing in which the same reference numerals have been applied to the several views, the gauging apparatus in the particular embodiment herein illustrated is one adapted for gauging and selecting different dimensions of a piston of an engine or the like, although it will be obvious that various features of the invention are equally applicable to gauging applications for other articles of various sizes and shapes. Furthermore, it will be understood that while the embodiment of the invention which will be described herein includes different gauging elements for gauging the depth and width of piston ring grooves, the skirt diameter, and the diameter of the two piston pin openings and for marking the piston according to five different size classifications of the skirt diameter and for three different classifications of the pin hole diameter, other classifications can be employed or some of the gauging elements omitted in accordance with the particular character of results to be obtained and in accordance with the particular article to be gauged.

The gauging apparatus in general comprises a main support 10 on which hinged doors 11 are provided to normally close and protect the gauging mechanism, these doors providing a front opening as will be apparent from Fig. 1 through which the articles are supplied to the gauging station. Above the support 10 is an electrical control panel 12 carrying the electrical coils, relays and the like forming a part of the gauging system, the front of the panel serving as a support for signal lamps and preferably carrying a representation of the article showing the different elements which are to be gauged.

As will be apparent from Figs. 3, 4, 5, and 6, a piston 14 is applied at the loading station 15 by merely dropping it on a feed slide 16 which is reciprocally operable along a guideway 17 on the support 10. This feed slide has an upwardly projecting arranging device 18 that loosely receives the open lower end of the piston, this device having side arms 19 each provided with a groove or passage 20 in line with the piston pin opening. The width of these side arms 19 is somewhat less than the distance between the piston pin bosses and while there is some substantial clearance between the piston pin bosses and the side arms 19, the rotational movement permitted the piston when it is on the slide 16 is limited so that the piston pin opening is generally in alignment with the direction of travel of the piston as it moves towards the gauging station. The upper portions of the arms 19 are tapered, as indicated in Fig. 3, for cooperation with the lower rounded portions of the piston pin bosses, in order to rotate the piston automatically as the piston is dropped in place, if the piston pin opening is not generally in alignment with the direction of feeding movement. The operator is therefore relieved of the problem of arranging the piston in any particular manner except that he must apply it with the piston head uppermost, and as it is dropped on the feeding slide, the arranging device in conjunction with the side guide bars 22 properly arrange the piston so that the piston pin opening 23 will necessarily enter the tapered outer end of a gauging spindle 24 which is located at the gauging station as will be further described. As the piston moves on to the gauging spindle which has only a very limited clearance with respect to the piston pin opening, the piston is picked up a few thousandths of an inch off of the slide 16 and accurately arranged so it will be properly applied in a predetermined position to the gauging station.

Figure 14:
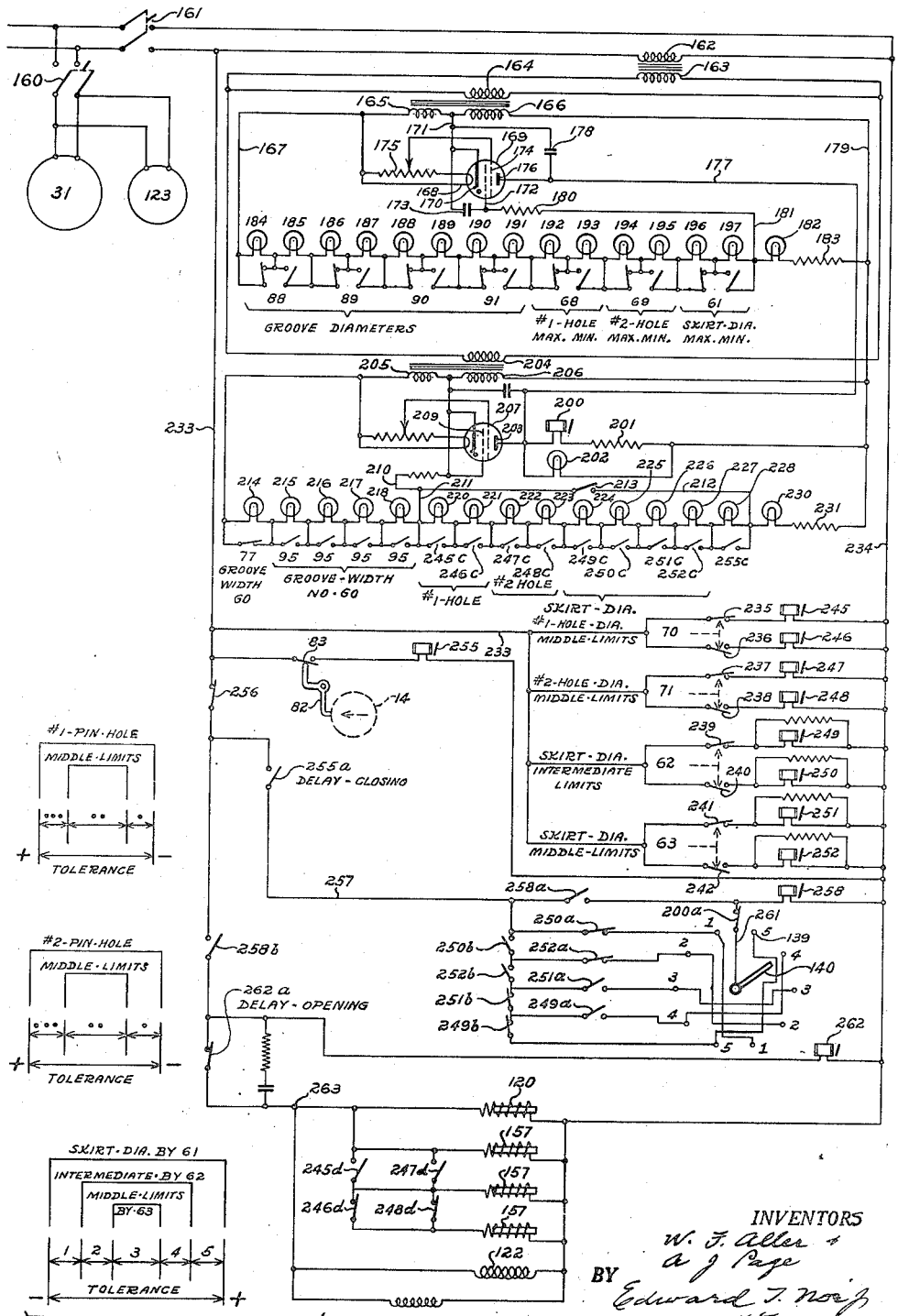
Fig. 14 is a diagrammatic view illustrating the electrical connections of the various parts of the gauging apparatus.

The feed slide 16 is continuously driven back and forth by means of two feed cams 26 and 27 fixed on a shaft 28 which is operated through suitable gearing in a gear chamber 29 driven by a pulley 30 which is belted to a drive motor 31 omitted in Fig. 3 but illustrated in Fig. 14. Cams 26 and 27 are respectively engaged by rollers on rock arms 32 and 33 both of which are fixed to a lever 34 which is pivotally connected at 35 to a plate 36. Slidable in the plate 36 is a bar 37 having a notch 38 engaged by a toe 39 in lever 40. Lever 40 is pivoted at 41 on the plate 36 so that normally the toe 39 is engaged in the notch 38 under the pressure of a spring 42 which is strong enough to hold the parts firmly to one another in normal operations and cause the bar 37 to move back and forth in a substantially positive manner.

The bar 37 is pivotally connected by a pin 44 to the lower end of the feed slide 16 as shown in Fig. 3. However, there is interposed between the end of the bar 37 which is connected to the lower end of the fixed slide and the other portion of the bar which is connected to the plate 36, a telescopic spring pressed connection 45 which permits limited movement of the plate connected portion of the bar in a direction towards the right, as viewed in Fig. 3, when the piston is in gauging position so that the piston is finally applied in gauging position under a substantially uniform spring pressure.

The lower side of the bar 37 has shoulders 47 adapted, at times, to be engaged by a toe 48 on a lever 49 pivotally mounted at 50 on the support, when the lever 49 is moved up from its normal position shown in Fig. 3. If the lever 40 is moved up during the feeding movement of the piston before the piston reaches the gauging position in which it is shown in Fig. 3, it will be apparent that the toe 48 engaging one of the shoulders 47 will positively stop movement of the bar 37 and under these conditions the toe 39 of lever 40 will ride out of the notch 38 during the continued movement of arm 34 towards the right. The toe 39, however, will automatically pick up its engagement with the notch 38 on its return movement and reconnect itself and continue normal operation of the bar 37 if the lever 49 in the meantime has been lowered out of engagement with lug 47. A link 52 is pivotally connected to the lever 49 and to a bent lever 53 pivotally mounted at 54 on the support 10. Lever 53 extends upwardly and is fixed to a release bar 56 which extends across the path of feeding movement of the piston from loading station to gauging station above the normal level of the piston if the piston is properly applied to the arranging device 18. In its normal movement to gauging position, the piston will thus have no contact with the release bar 56 but if its piston pin bosses are just balanced on the upper portions of the side arms 19 of the arranging device with the piston pin opening 90 degrees from its proper position, then the upper portion of the piston will be moved against the bar 56 as the piston moves towards gauging position, forcing the bar 56 to the right and thus lifting link 52 and raising arm 49 so that the toe 48 engages and stops the bar 37 and temporarily disables the feeding mechanism. When the toe 39 picks up notch 38 in its return travel towards the left as viewed in Fig. 3, it will move the feed slide back to loading position and the jostling action given to the piston in this movement will jar the piston sufficiently so it will drop down to its proper position. If it should not do so, the operator can of course reposition the piston, but that has been found unnecessary except under extraordinary conditions.

The release bar 56 is also effective to prevent injury to the hands of the operator in case he should have his hand or fingers on the advancing side of the piston or between the piston and the bar at a time when the piston is moving towards gauging position, for in that case the fingers of the operator rather than the upper portion of the piston will engage and push back the bar 56 and thus disable the power feed. It will be understood that the lugs 47 on the bar 37 are so positioned as to be ready for prompt engagement with the toe 48 when either the piston or the fingers of the operator are forced against the bar 56.

A stop pin 57 on the support 10 prevents counterclockwise movement of lever 53, as viewed in Fig. 3, thus holding it in normal position against the force of gravity.

The gauging mechanism effective at the gauging station will now be described. This gauging mechanism comprises a pair of opposed air nozzles 59, see Fig. 13, located in guide plates 60 which are arranged in line with and behind the guide bars 22. These nozzles are near the lower end of the piston skirt and diametrically opposed with respect to the piston when the latter is in gauging position. The amount of air supplied under pressure to the gauging nozzles 59 and leaking between the nozzles and the piston depends upon the diameter of the piston skirt and the amount of this air leakage is gauged by a plurality of switch controlling air gauges 61, 62, and 63, all controlled in accordance with the pressure obtaining at the air jets. These switch controlling gauges may be of the character disclosed in Patent 2,448,653, granted September 7, 1948. Each switch controls two contacts both of which are closed if the dimension of the article gauged is within a predetermined size range for which the contacts have been adjusted, the size ranges being different for the different switches so that five different selections are obtainable within the limits of permissible maximum and minimum limits. These three switches as will be presently explained control the selection of the proper character to be marked on the article gauged by the application of a stamp which inks or imprints the character on the article. For this purpose, where five different selections are to be provided, the stamp is provided with characters numbered 1, 2, 3, 4 and 5 although various other characters may be used representative of the different size ranges.

The diameter of the piston pin holes is gauged by annular air jets 66 and 67 in the air gauging spindle 24, these jets communicating with air pressure controlled gauging switches 68, 69, 70 and 71 similar to switches 61 to 63. The air jet 66 controls the operation of switches 68 and 70 while air jet 67 controls switches 69 and 71. Each pair of switches communicating with one of these air jets provides for three selections within the tolerance of the piston pin diameter as well as providing for rejection of oversize and undersize holes that fall outside of the tolerance limits. These switches control marking devices that apply one, two or three ink dots on the piston skirt as will be further explained.

When the piston is placed in gauging position in the gauging station, one of the piston ring grooves is adapted to receive a roller 73 if the groove is wide enough, without forcing this roller rearwardly. The roller is arranged on an arm 74 pivotally mounted at 75 and having a projection 76 that opens a normally closed microswitch 77 if the piston ring groove width is less than a predetermined minimum tolerance requirement, for in that case the piston ring groove will not be wide enough to receive the roller 73.

When the piston is applied to the gauging station it comes up against a stop lug 80, see Fig. 3, which is fixed on a block 81 rigid with the support 10. In this position of the piston a part of the piston wall pushes rearwardly on a lever 82, see Figs. 13 and 14, closing a normally open microswitch 83 which energizes the gauging circuits as will be presently described.

The diameter of each piston ring groove is gauged by means of a pair of opposed gauging feelers 85 and 86 which are spaced apart a distance dependent upon the diameter of the groove, operating the gauging plunger 87 of a double contact gauging switch 88 preferably of the character disclosed in Patent 2,254,812, granted September 2, 1941, the manner in which the gauging feelers 85 and 86 are supported for yielding movement also being disclosed in that patent. It will be understood that a pair of opposed gauging feelers is provided for each ring groove, each pair of feelers controlling its respective gauging switch 88, 89, 90 and 91.

The roller 73, as previously mentioned, is controlled to operate the switch 77 if the groove width is too small. To check the groove width and make sure it is not too large there is a gauging feeler 93 for each groove. Each of these feelers is carried on a spring supported arm 94, the feeler 93 being slightly thicker than the acceptable maximum width of the ring groove so that it will normally be pressed back by the piston to operate a microswitch 95, one for each feeler, except when it is permitted to enter the groove due to the groove being too wide. Thus the fingers 93 operate in conjunction with the roller 73 so that together they determine that the grooves are of such width as to fall within the maximum and minimum tolerance limits permitted, or to fall outside of those limits.

The marking mechanism employed for marking the several skirt diameter selections on the top of the piston is illustrated in Figs. 7 and 12, and as shown in those figures, the several characters, namely, the numbers 1 to 5, corresponding to the five selections produced, are arranged in the form of projections on a stamping roller 100 which rolls in contact with an inking roll 101. This inking roll is preferably a readily removable ink saturated pad, freely rotatable on the shaft 102. A retaining plate 103, see Figs. 8 and 12, may be swung back after loosening the holding screw 104 and permit endwise removal of the inking pad. A spring blade 105 is fixed at one end on a bracket 106 that carries the inking mechanism on the support 10. The other end of the spring blade engages a supporting arm 107.

pivotally mounted at 108, and the arm 103 is mounted at one end of arm 107 so that the inking roll is yieldingly held down against the marking roll, tension spring 109 tending to counterbalance the weight of the inking roll.

The normal position of the marking roll 100 is as shown in Figs. 3, 7 and 8, being slightly elevated above the top of the piston. This roll is fixed on a shaft 110 by spring pressed retaining arms 143 and is rotatable in the outer ends of two spaced carrying arms 111 and 112 rigidly connected together, the other ends of these arms being mounted for pivotable movement on a shaft 113 carried in bearings 114 arranged on the bracket 106. The arm 112 is provided with an upwardly extending portion 116 having a slot 117 receiving an operating pin 118 in the end of a link 119 which is operated by a solenoid 120, see Fig. 7. When the solenoid is energized it moves the link 119 to the left as viewed in Fig. 7 beyond the position of the parts shown. It will thus pull the extension 116 of the arm 112 and move the arm counterclockwise so as to depress the marking roll 100 and apply a selected character to the top of the piston. Thus a character such as 1, 2, 3, 4 and 5 will be inked on the piston according to the size of the skirt diameter. As the roll 100 moves downwardly it travels away from the inking roll temporarily but it yieldingly energizes the inking roll on a return movement when the solenoid 120 is deenergized and the lever arms 111 and 112 are pulled upwardly by the return spring 121, see Fig. 7.

Carried by the top of the bracket 106 is an electric motor 123 which operates a pulley 124 connected by belt 125 to a drive wheel 126. This drive wheel is fixed to a drive shaft 127 and a friction drive wheel 128 which drives the rubber surface 129 of a wheel 130 fixed on shaft 110. The motor 123 thus continuously rotates the stamp roll 100 through a frictional drive connection such that the shaft 110 may be held against rotation during continued movement of the motor. Until the gauging cycle is initiated and the proper character is selected, the marking wheel continues to rotate at a fairly rapid rate. The wheel is stopped by means of a locking pawl 132 pivotably mounted on the shaft 113 and having an upward extension 133 which has a round hole receiving the pin 118 so that the pawl 132 must move with the link 119 under the control of the solenoid 120. In its normal position the link 119 is somewhat to the right of the position of that part as shown in Fig. 7 where the parts have been illustrated after a partial movement of the link 119 has taken place. This partial movement has brought the pawl 132 into depressions 135 in the wheel 130 which is fixed against rotation with respect to marking roll 100. In its normal position the pawl 132 is displaced clockwise from the position shown in Fig. 7 and is free of the depressions 135 of the marking roll, it being understood that the first movement of the link 119, traveling towards the left as viewed in that figure, is to apply the pawl 132 and stop the rotation of the marking roll while taking up the lost motion that the slot 117 provides between the link 119 and the arms 111 and 112. Continued movement of the link 119 then moves the pawl and the marking roll together in a downward direction to apply the selected character to the piston.

The selection of the proper character corresponding to the gauged dimension of the article is effected as follows: A fixed member 137 on arm 112 is provided with a series of electrical terminals 138 corresponding in number to the total number of individual characters on the marking roll. While the marking roll may have five equally spaced characters 1, 2, 3, 4 and 5 for example, it is preferred, in obtaining five selections, to have two series of 1, 2, 3, 4 and 5 characters all equally spaced around the roll and in this case there will be ten electrical terminals 138 to which ten different wires are connected as will be more fully explained in connection with the electrical circuits. Each terminal has a contact 139 and the several terminals are adapted to be contacted one after the other with a rotatable wiper contact or brush 140 on a yielding brush plate 141 provided on a disk 142 which is fixed to the shaft 110 so it will move with the marking roller. The arrangement is such that one of a series of electrical circuits is energized at the proper time in the sequence of the gauging operation after the piston or other article gauged is moved into gauging position. If the size range of the piston skirt is classification number 2 for example, then the number 2 terminal will be energized and as soon as the brush 140 reaches one of these energized number 2 terminals, a circuit through solenoid 120 is energized to automatically bring the pawl 132 into locking engagement with the marking wheel and stop the marking wheel so the number 2 character is centrally below the axis of the shaft 110, continued movement of the solenoid then immediately depressing the marking wheel and applying the number 2 character to the piston top. As soon as the solenoid 120 is deenergized these parts then return, pawl 132 being withdrawn by retracting spring 146, a portion of which is shown in Fig. 8, so that the marking roll will again rotate in contact with the inking roll.

Current is taken from the contact disk 142, see Fig. 11, by means of a spring pressed brush 144 engaging the peripheral surface of this disk and electrically connected to the controlling circuits as will be presently described.

A curved cover plate 148, shown in Figs. 2 and 3, is carried by the outer ends of the arms 111 and 112 and forms a protection for the electrical parts of the marking mechanism.

The double contact switches 68, 69, 70 and 71, which are controlled in accordance with the diameters of the two piston pin holes are arranged to automatically operate inking bars or tubes 150, 151 and 152 which are illustrated in Figs. 2 and 4, the lower ends of these bars carrying inking pads 153 engageable with the piston skirt but normally spaced from the skirt. Each of the inking bars is pivotably supported at 154 on a mounting bracket 155, the bars themselves extending upwardly and having ink chambers 156 at their upper ends. The bars are hollow so that the ink is supplied to the pads 153. These bars are each controlled by a solenoid such as the solenoid 157 operating a link 158 so as to pull outwardly on the upper end of the inking bar and thus move the pad in the lower end of the inking bar against the piston skirt. The three solenoids 157 that control the three bars are controlled by the pressure controlled switches 68, 69, 70 and 71 so one, two or all three of the inking pads are applied to the piston skirt according to whether the size of the piston pin hole falls in the 1, 2 or 3 size classification.

The electrical connections of the various parts are shown in Fig. 14. The supply source, preferably 110 volt, 60 cycle, is applied to starting switches 160 and 161, switch 160 energizing the motors 31 and 123. Switch 161 supplies current to the primary winding 162 of a transformer having a secondary winding 163 supplying regulating voltage to the primary winding 164 of another transformer which has secondary windings 165 and 166. The winding 165 supplies about 6 volts to a lead 167 connected to the filament 168 of a thyratron tube 169. The latter has a cathode 170 connected to the lead 171 which is connected between the transformer windings 165 and 166. The control grid 172 of the tube connects through a condenser 173 to the lead 171. The screen grid 174 connects to a potentiometer 175. The anode 176 is connected to a lead 177 and to a condenser 178 which connects the lead 171. One end of the transformer winding 166 is connected to a lead 179. Control grid 172 connects through a resistance 180 to a connection 181 which connects through a lamp 182 and resistance 183 to the lead 179. The lead 181 is connected to a lamp series comprising lamps 184, 185, 186, 187, 188, 189, 190, 191, 192, 193, 194, 195, 196, and 197 and across each lamp is a switch contact, as shown, these contacts being the contacts of switches 88, 89, 90, 91, 68, 69 and 61. The first four of these switches are responsive to the diameter of the piston ring grooves; switches 68 and 69 are responsive to the maximum and minimum limits of the two piston pin holes, while switch 61 is for the control of the maximum and minimum limits of the skirt diameter. All of these switches will be closed if all the dimensions checked fall within the desired tolerance limits controlled by these switches, thus extinguishing all of the lamps in the series due to the short circuiting action of the switches. If any of the switches are open, however, that may be noted by the operator who sees the corresponding lamp illuminated and the color of the lamp, which may be red or green for undersize or oversize conditions, shows him whether the part is too large or too small. Lamp 182 shows if any of the lamps of the series 184 to 197 is burned out. The resistance 183 is high enough compared to the total resistance of all the lamps so that any one or all of the lamps can burn if connected across the leads 179 and 167.

Current can flow in the cathode anode circuit of tube 169 if the control grid is less negative with respect to the cathode and this will occur if any of the lamps 184 to 197 is in circuit since that will change the voltage supply to the control grid 172 due to the connection between the control grid 172 and the lead 181. Thus if any one or more of the lamps 184 to 197 is illuminated due to its short circuiting switch being open, then current will flow through the lead 177, to the relay 200 and through that relay and the resistance 201 to the lead 179 and back to the transformer winding 166. The relay 200 is therefore energized if any of the contacts controlled by the various switches 88, 89, 90, 91, 68, 67 and 61 are open. When the relay 200 is energized a master light 202 is also energized to show the operator that at least one of the dimensions gauged falls outside the maximum or minimum tolerance requirements.

The transformer winding 163 also supplies current to a second transformer primary 204 which energizes the secondary windings 205 and 206 connected to a thyratron tube 207 having an anode 208 which supplies current when the control grid 209 is less negative with respect to its cathode to energize the winding 200, the connections of the elements of the tube 207 being similar to the connections of the tube 169, two of these tubes being supplied in order to give adequate power in view of the considerable number of lamps and switches involved in the circuit. The control grid 209 of the tube 207 is connected to a lead 210 which connects to leads 211 and 212, the latter containing a manually operable switch 213 which is closed during automatic operation but open during setup adjustments. Lead 211 connects to a series of lamps 214, 215, 216, 217 and 218. Across the green lamp 214 is the normally closed switch 77 which opens only when the groove width is too narrow. Across the four red lamps 215, 216, 217 and 218 are the four normally open switches 95, any one of which is closed when a piston is in gauging position if the width of its respective groove is not too wide for the maximum tolerance permitted. Thus all these switches will normally be closed and all of these lamps short circuited if the groove width satisfies the maximum and minimum tolerance requirements. And if all of these switches are closed the cathode anode circuit of tube 207 will not conduct current. It will, however, supply current through the relay 200 if any of these switches is open to show that the part should be rejected.

The several lamps 220, 221, 222, 223, 224, 225, 226, 227 and 228 are in series with the lamps 214 to 218 during setup operations with the switch 213 open and also in series with the indicating lamp 230 and a resistance 231, lamp 230 failing to illuminate if any of the various lamps in series with it are burned out at a time its respective short circuiting switch is open. The lamps 220 to 228 inclusive are individually short circuited by switches controlled by relays as will be presently described.

Current from the source supplied through the switch 161 is carried to leads 233 and 234, lead 233 having a connection to the switch contacts 235 and 236 of the switch 70 which is properly set to give the maximum and minimum range of selection of one of the piston pin holes. Lead 233 is also connected to the contacts 237 and 238 of the switch 71 which makes a corresponding determination for the other piston pin hole. The lead 233 is also connected to the contacts 239 and 240 of the switch 62 which determines the intermediate limits of the skirt diameter selection. In the same way there is a connection to the contacts 241 and 242 of the switch 63 which determines the middle limits of the skirt diameter selection. The switch contacts 235 to 242 inclusive are connected respectively to switch operating relays 245, 246, 247, 248, 249, 250, 251 and 252, the other ends of which are connected to the lead 234. If for example the number 1 hole diameter falls within the number 2 classification, or in other words in the middle range of acceptable size, both switches 235 and 236 will be closed and both relay windings 245 and 246 will be energized. Under these conditions, since the part falls within the overall maximum and minimum permissible tolerances, the number 1 hole maximum and minimum control switch 68 will have both of its contacts closed. On the other hand, if the number 1 hole is a number 1 size or selection, both contacts of switch 68 will be closed but only one of the contacts, namely, the contact 236 of switch 70 will be closed and the relay coil 245 will not be energized.

Connected across the leads 233 and 234 is the lever operated switch 83 which is closed by the piston when the piston enters gauging position as previously described. When this switch closes it energizes a switch controlling relay 255 in series with it to close a switch 255a which is delayed in closing. The reference numeral of a relay winding will be used with a letter suffix to designate the switch or switches controlled by that relay. The switch 255a closes after a short time relay in order to permit the moving parts to stabilize immediately following application of the piston to gauging position. Switch 255a is connected through a normally closed manually operated supply switch 256 to the lead 233 and supplies current to a lead 257. This lead is connected to a switch 258a which is closed when its control relay 258 is energized, switch 258a thus serving as a holding switch for its relay. The lead 257 also connects to switch 250a controlled by relay 250. The other side of this switch 250a is connected to one of the terminal connections 139 of the marking apparatus that stamps the numbers 1, 2, 3, 4 or 5 on the piston corresponding to the skirt diameter size. As shown, this switch 250a connects to both of the number 1 connections corresponding to the number 1 character on the marking device. Switches 252a, 251a, 249a, 250b, 252b, 251b and 249b are connected as shown to the other terminals numbered 2, 3, 4 and 5 as shown. The relays 249 to 252 which control these switches also control switches 249c, 250c, 251c and 252c, connected as shown across the lamps 224, 225, 226 and 227 previously referred to. In series with these switches 249c to 252c are the switches 245c to 248c inclusive controlled by the relays 245 to 248, and a switch 255c controlled by relay 255.

The movable wiper contact or brush 140 of the marking mechanism is connected through a lead 261 to a switch 200a controlled by relay 200 which is energized to open the switch 200a only if a thyratron tube fires due to any part being outside of the maximum or minimum tolerance requirements of any of the various dimensions gauged. Switch 200a is therefore normally closed.

Switch controlling relay 258 also controls another switch 258b which connects lead 233 to a relay 262 which controls time delay switch 262a through which current may be supplied from the leads 233 and 263 when the switch 258b is closed to energize the stamping solenoid 120 and also energize the primary of a transformer 122 which may be connected to operate a bell or gong. Switch 262a closes promptly when the relay 262 is energized but is delayed on opening. Lead 263 also connects to the three solenoids 157 and switches 245d, 246d, 247d and 248d, these solenoids 157 being energized one, two or three at a time to move the marking rods that apply 1, 2 or 3 dots or marks on the side of the piston in accordance with the size of the piston pin hole.

The various switches are adjusted to the proper size range in accordance with any particular requirement. Fig. 14 shows how the six contacts of the three pressure operated switches 61, 62 and 63 provide five selections of acceptable size of the piston skirt diameter and how the two pressure operated switches 69 and 70 of the number one pin hole, for example, give three acceptable selections. A piston is applied by the operator to the feeding means while the feed slide is retracted but without stopping its continuous operation. The piston is then moved by the arranging device 18 and carried forward to gauging position, the arranging device serving to automatically position the piston so that the piston pin hole is generally in line with the end of the gauging spindle 24 before the spindle enters that hole. Continued movement of the piston thus brings the piston on to the spindle and into exact position for gauging. Entering the gauging position, the forward side of the piston closes the switch 83 and energizes the timer switch relay 255, closing switch 255a and thus supplying power to the lead 257. If the piston skirt diameter falls with the number 1 classification, the switch 250a will remain closed since switch 240 will remain open. Switch 250b will remain open so that none of the other terminals 2, 3, 4 and 5 of the marking device will be energized. As soon as the revolving brush 140 touches either one of the terminals number 1 of the marking device, current will flow from the line side 233, closed switches 255a and 250a, through the brush 140 and closed switch 200a and energize relay 258 connected to the other side of the line 234. This will take place, however, only if the switch 200a remains closed but it will remain closed if none of the dimensions gauged by the other gauging devices falls either inside or outside the maximum tolerance limits. No current flows through relay 200 under these conditions since all the lamps in the two lamp series are short circuited by their respective controlling switches. Relay 258 is then energized as previously mentioned and closes the switch 258a constituting a holding switch, so that even though the contact made by the brush 140 with the contact terminal number 1 is temporary, the relay 258 will energize and remain energized. Energization of this relay 258 closes switch 258b and energizes the relay 262, closing switch 262a and supplying current to the stamping solenoid 120. This stamping solenoid as has been previously mentioned first stops the rotation of the marking disk and then brings the marking disk down to apply the number 1 character on the top of the piston. The notches in the marking disk are so positioned that the pawl that stops rotation of the marking disk will arrange the disk so that the proper number is immediately below the axis of the disk. If the size of the piston skirt is a number 2 selection then the relay 250 will be energized, since the switch 240 at this time will be closed. Switches 250a will then be open and switch 250b closed. Switch 252a will remain closed since switch 242 is now open. Switch 252b will remain open so that it is only the number 2 terminal connection of the marking device that is energized and the rotating brush 140 will thus close this circuit when it first reaches a terminal number 2 and apply a number 2 marking on the piston. If the size range is number 3 then switches 250a and 252a will both be open, switches 250b and 252b both being closed since relays 250 and 252 are both now energized due to switches 240 and 242 being closed. Switch 251a will now be closed and switch 251b open due to the deenergization of relay 251, switch 241 being now open. Thus it is only the number 3 contact station of the marking device that is energized and which could give a circuit connection between the rotating brush to energize the stamping solenoid 120 by closing switch 258b. In a similar manner terminals 4 and 5 respectively are the only terminals energized for the number 4 and 5 classifications respectively. It should be noted that the solenoid 120 is energized as soon as switch 258b closes, the delayed opening switch 262a remaining closed for a substantial time after its controlling relay 262 is energized and only opening after a time delay sufficient to permit the stamping operation. Following the stamping operation, which occurs during a dwell period in the operation of the slide operating mechanism when the piston is in gauging position, the piston is retracted and as soon as it starts to leave gauging position the piston opens the lever-operated switch 83, thus deenergizing relay 255 so as to open the switch 255a immediately and deenergize the relay 258 so as to reestablish the circuit ready for the next operation.

In the gauging operation if the pin hole is within the middle limits of the acceptable size range, i. e., number 2 classification, switch 235 will be closed, energizing winding 245, closing switch 245d so that two of the solenoids 157 will be energized when the switch 258b closes. The third solenoid will not be energized since the windings 246d and 248d are both open, switches 236 and 258 both being closed and windings 246 and 248 both being energized. For a number 3 classification of the number 1 pin hole, winding 245 is energized closing switch 245d, winding 246 is deenergized, switch 246 being open so that switch 246 remains closed and all three solenoids will then mark three dots on the side of the piston. One dot is applied when switch 245d remains open due to winding 235 remaining closed.

No mark will be applied to the piston if switch 258b remains open or in other words if there is a failure to energize winding 258, and this occurs if the switch 200a is open for any reason and it will be so open if either one of the thyratron tubes fires and supplies current to the coil 200 because of the opening of any one of the various switches 88, 89, 90, 91, 68, 69, 61, 77 or 95, all of which are normally closed if the particular dimension controlled by these switches falls within the maximum or minimum limits permissible. The operator can therefore determine by the mere fact that there is no marking on the piston that at least one of the dimensions checked fails to meet acceptable requirements, and he may note, during the gauging operation, to see which particular lamp or lamps flash on if that should occur to determine just which particular dimension fails to meet tolerance requirements.

As will be readily understood, the gauging apparatus is one capable of very rapid operation since the feeding cycle takes place continuously without substantial pause except for the temporary dwells at the ends of the feeding strokes to give sufficient time for the operator to drop the piston at the feeding station and sufficient time for the gauging and marking operation to take place while the work is at the gauging station. Acceptable pistons will thus be automatically classified and marked according to their classifications so they may be assembled with cooperating parts of the proper size for which they are adapted. The automatic stamping operation is carried out very rapidly and with no possibility of operator's error such as might be obtained where the operator has to translate signal lights or gauge indications and do the marking himself.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A piston gauging apparatus comprising a support having a gauging station and a loading station, each at a fixed location thereon, means in said gauging station for gauging piston dimensions, guide means on said support extending rectilinearly from the loading station into said gauging station, a piston holder carried on said guide means, drive means connected to said holder for cyclically sliding it from the loading station into said gauging station and return, marking means associated with said gauging station having a series of different characters indicative of different piston dimensions, a series of switch means operatively connected to said gauging means and instantaneously responsive to the gauging means in accordance with a size dimension of the piston, and means controlled by said switch means for operating said marking means to bring a selected character into marking position and apply the selected character to the piston.

2. A piston gauging apparatus comprising a support having a gauging station and a loading station, each at a fixed location thereon, means in said gauging station for gauging a number of dimensions of a piston, guide means on said support extending rectilinearly from the loading station into said gauging station, a piston holder carried on said guide means, drive means connected to said holder for cyclically moving it from the loading station into said gauging station and return, marking means associated with said gauging station having a series of different characters indicative of different ranges of a selected piston dimension, a series of switch means operably connected to said gauging means instantaneously responsive to the gauging means in accordance with the ranges of a given dimension of the piston, means controlled by said switch means for operating said marking means to bring a selected character into marking position and apply the selected character to the piston, and means operably connected to said gauging means for rendering said marking means ineffective when a piston exceeds the desired tolerance range of any gauged dimension.

3. A piston gauging apparatus comprising a support having a gauging station and a loading station, each at a fixed location thereon, means in said gauging station for gauging piston dimensions, guide means along said support extending rectilinearly from the loading station into said gauging station, a piston holder carried on said guide means, drive means connected to said holder for cyclically moving it from the loading station into said gauging station and return, a locating abutment carried in said gauging station for engagement with a piston upon the holder movement into the gauging station, marking means associated with said gauging station having a series of different characters indicative of different article dimensions, a series of switch means operatively connected to said gauging means instantaneously responsive to the gauging means in accordance with a size dimension of the piston, an enabling switch including an actuating element projecting beyond the locating abutment when a piston is not engaging the abutment and operatively connected with said switch means for initiating the gauging operation upon its contact by a piston being gauged, and means controlled by said switch means for operating said marking means to bring a selected character into marking position and apply the selected character to the piston.

4. A piston gauging apparatus comprising a support having a gauging station and a loading station, each at a fixed location thereon, guide means along said support extending rectilinearly from the loading station to said gauging station, means in said gauging station for gauging the piston skirt diameter along a line transverse said guide means, a piston holder carried on said guide means, drive means connected to said holder for cyclically moving it from the loading station into said gauging station and return, a locating abutment carried in said gauging station for engagement with a piston upon the holder movement into the gauging station, marking means associated with said gauging station having a series of different characters indicative of different skirt diameters, a series of switch means operatively connected to said gauging means instantaneously responsive to the gauging means in accordance with the piston skirt diameter, an enabling switch including an actuating element projecting beyond the locating abutment when a piston is not engaging the abutment and operatively connected with said switch means for initiating the gauging operation upon its contact by a piston being gauged, and means controlled by said switch means for operating said marking means to bring a selected character into marking position and apply the selected character to the piston.

5. A piston gauging apparatus comprising a support having a gauging station and a loading station, means in said gauging station for gauging piston dimensions, a piston holder having an upwardly projected positioning means for cooperation with the piston pin bosses of a piston placed thereover to automatically shift the piston to bring the piston pin hole into substantial alignment with the direction of holder movement, means moving the holder between the loading station and said gauging station, marking means associated with said gauging station having a series of different characters indicative of different article dimensions, a series of switch means operatively connected to said gauging means instantaneously responsive to the gauging means in accordance with a size dimension of the piston, means controlled by said switch means for operating said marking means to bring a selected character into marking position and apply the selected character to the piston, said gauging means including a hole gauging spindle and means supporting said spindle in alignment with said guide means for entrance into the piston pin hole upon movement of the holder into the gauging station.

6. A piston gauging apparatus comprising a support having a gauging station and a loading station, each at a fixed location thereon, means in said gauging station for gauging piston dimensions, guide means on said support extending rectilinearly from the loading station into said gauging station, a piston holder carried on said guide means, said holder having an upwardly projected positioning means for cooperation with the piston pin bosses of a piston placed thereover to automatically shift the piston to bring the piston pin hole into substantial alignment with the direction of holder movement, drive means connected to said holder for cyclically moving it from the loading station into said gauging station and return, marking means associated with said gauging station having a series of different characters indicative of different article dimensions, a series of switch means operatively connected to said gauging means instantaneously responsive to the gauging means in accordance with a size dimension of the piston, means controlled by said switch means for operating said marking means to bring a selected character into marking position and apply the selected character to the piston, said gauging means including a projecting hole gauging spindle, and means supporting said spindle in alignment with said guide means for entrance into the piston pin hole upon movement of the holder into the gauging station.

7. A piston gauging apparatus comprising a support having a gauging station and a loading station, each at a fixed location thereon, means in said gauging station for gauging piston dimensions, guide means on said support extending rectilinearly from the loading station into said gauging station, a piston holder carried on said guide means, said holder having an upwardly projected positioning means for cooperation with the piston pin bosses of a piston placed thereover to automatically shift the piston to bring the piston pin hole into substantial alignment with the direction of holder movement, drive means connected to said holder for cyclically moving it from the loading station into said gauging station and return, marking means associated with said gauging station having a series of different characters indicative of different article dimensions, a series of switch means operatively connected to said gauging means instantaneously responsive to the gauging means in accordance with a size dimension of the piston, and means controlled by said switch means for operating said marking means to bring a selected character into marking position and apply the selected character to the piston, said gauging means including a projecting hole gauging spindle having a tapered outer end and fixed on said support in the gauging station, means supporting said spindle in alignment with said guide means with its axis slightly above the axis of the piston pin hole when a piston is supported on said holder for entrance into the piston pin hole upon movement of the holder into the gauging station whereby the piston is elevated when the spindle enters the piston pin hole.

WILLIS FAY ALLER.
ANTHONY J. PAGE.

References Cited in the file of this patent

UNITED STATES PATENTS

| Number | Name | Date |
|---|---|---|
| 1,113,472 | Nichols | Oct. 13, 1914 |
| 1,604,475 | North | Oct. 26, 1926 |
| 1,652,298 | Burton | Dec. 13, 1927 |
| 1,850,404 | Vasseur | Mar. 22, 1932 |
| 1,868,615 | Radford | July 26, 1932 |
| 2,054,874 | Wilson | Sept. 22, 1936 |
| 2,331,422 | Reynolds | Oct. 12, 1943 |
| 2,345,732 | Davies | Apr. 4, 1944 |
| 2,373,941 | Benning | Apr. 17, 1945 |
| 2,404,750 | Schmidt | July 23, 1946 |
| 2,515,412 | Lee | July 18, 1950 |